July 1, 1958

L. C. SMALLEY 2,841,247

VEHICLE JACK

Filed May 25, 1954

INVENTOR
LOUIS CHARLES SMALLEY

BY

ATTORNEY

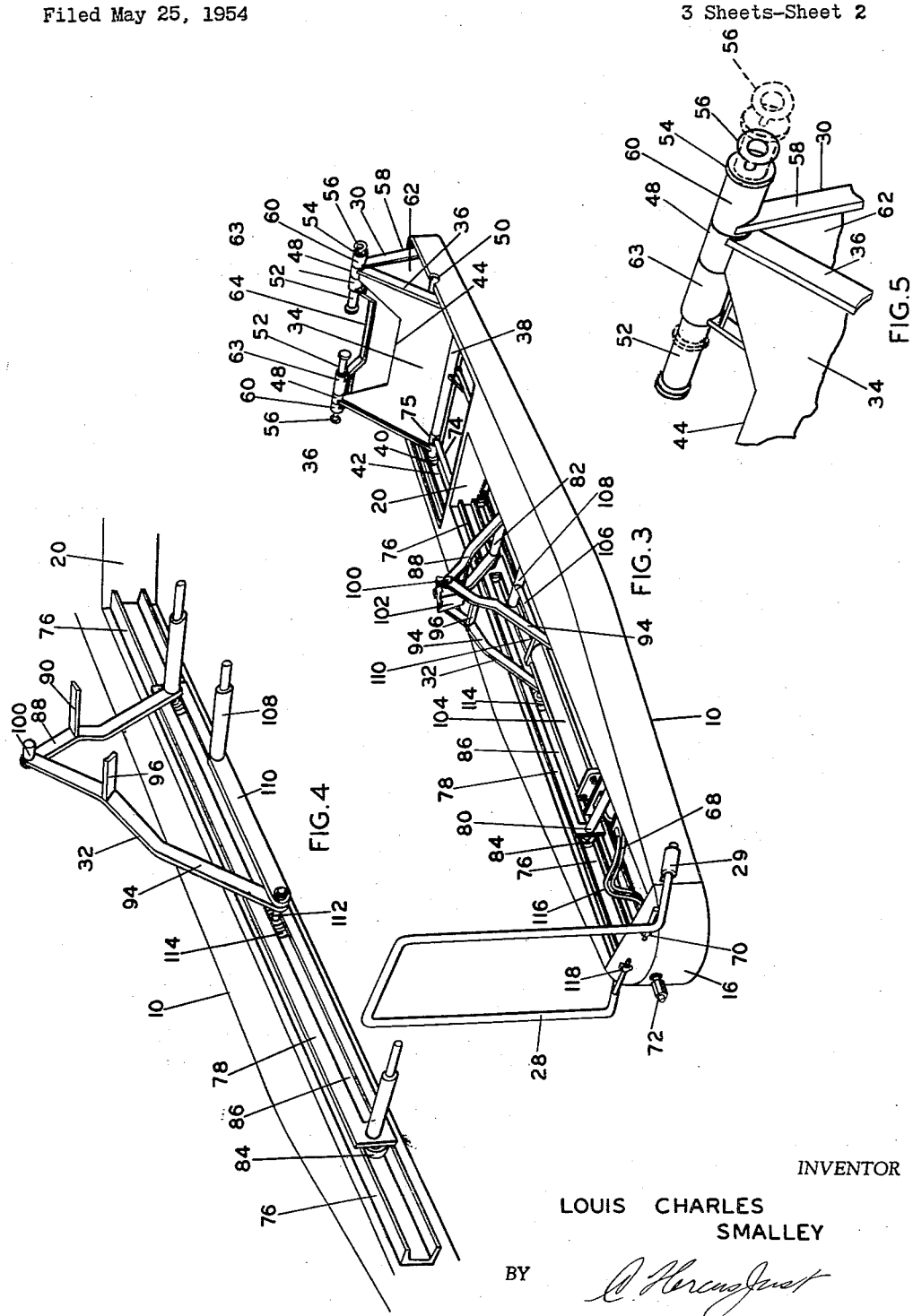

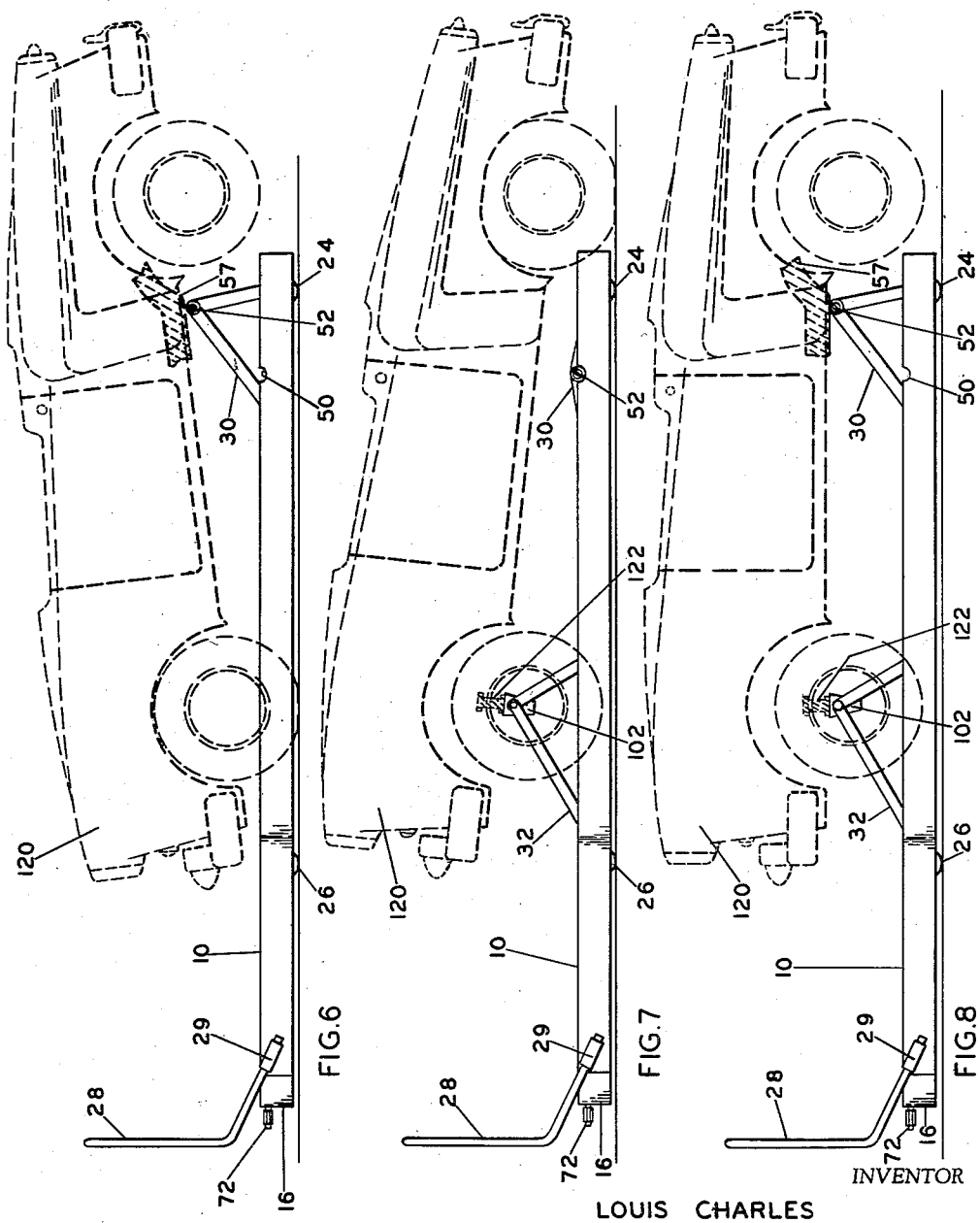

United States Patent Office 2,841,247
Patented July 1, 1958

2,841,247

VEHICLE JACK

Louis Charles Smalley, York, Pa., assignor to Carlift Company, Inc., York, Pa., a corporation of Pennsylvania Application May 25, 1954, Serial No. 432,182

13 Claims. (Cl. 187—8.41)

This invention relates to improvements in a vehicle jack and, more particularly, to a vehicle jack which preferably is portable and positionable longitudinally beneath a vehicle and is operable to raise and lower a vehicle by engaging the frame thereof, whereby when said vehicle is raised, the axles and wheels thereof are freely suspendable relative to said frame.

Various kinds of vehicle jacks are persently in use for purposes of raising and lowering an entire vehicle by engaging directly either the wheels of said vehicle or the front and rear axles of the vehicle. When a vehicle is raised by such means, the same relative positions of the wheels to the body and frame is maintained regardless of whether the jack is elevated or not. Modern car designs include deep skirted fenders and, in some instances, additional fender inserts are detachably secured to rear fenders particularly so as to cover the major portion of the rear wheels of the vehicle. Changing tires on such vehicles, mounting tire chains on the rear wheels thereof, fender repair, or repairing brakes or wheels, constitutes a serious problem on such modern vehicles in that the wheels and tires, as well as the inner surfaces of the fenders, are quite inaccessible when using conventional jacks of either the portable or stationary service-station type.

Since the advent of this type of fender design, so-called bumper jacks have come into use in order that the body and fender of a vehicle might be elevated relative to any individual wheel and tire so as to render the latter readily accessible for either changing the tire and wheel or mounting a tire chain thereon, for example. Bumper jacks, however, sometimes tend to either bend or break the bumper supporting arms. Under some circumstances, the frame and body of the vehicle may be more or less sprung or twisted when using such a bumper jack, and even windshields have been cracked due to such distortion of the frame and body.

To obviate the foregoing difficulties, it is the principal object of the present invention to provide a vehicle jack which is engageable either selectively or simultaneously directly with the front end member of a vehicle frame and/or the rearward portion of the side members of the frame for purposes of elevating the frame and body, independently of the wheels, thereby permitting free suspension of the axles and wheels of the vehicle without skewing, twisting or distorting the frame or body of the vehicle in any way.

It is another object of the invention to provide a jack of this nature which readily is portable while being connected to or disconnected from a source of fluid pressure, such as air or other power means, whereby the jack may accurately be positioned beneath a vehicle with a minimum of effort.

A still further object of the invention is to provide a jack of the type described in the foregoing objects with simple and effective front and rear jack units, at least one of which is adjustable longitudinally of the jack assembly and relative to the other jack unit, whereby the jack may readily be accommodated to a considerable range of different lengths of vehicles.

One other object of the invention is to provide on the rear jack unit of the assembly described in the foregoing auxiliary supporting members which are movable transversely relative to the frame of a vehicle in order to permit said auxiliary supporting members to engage directly from below the rearward portions of the side members of the vehicle frame, whereby said jack unit can elevate the frame directly and thereby permit free suspension of the rear axle and wheels of the vehicle when the rear end of the vehicle frame and body is elevated by said jack unit, the design of said auxiliary members being such that they readily engage the vehicle frame members at all degrees of elevation of the vehicle within the limits of the jack.

In addition to the foregoing object, it is still a further object of the invention to provide a front jack unit in the aforementioned jack assembly, said front jack unit being engageable preferably centrally with the front portion or member of a vehicle frame relative to which the front axles of so-called "knee action" front vehicle assemblies are individually movable, whereby said front axles and the wheels thereon may freely be suspended from the frame of a vehicle when said front jack unit is operated to elevate the front end of said vehicle.

Still another object of the invention is to provide a self-contained, portable jack assembly including front and rear jack units which are preferably operated by fluid pressure power means either selectively or in unison for purposes of raising either the front or rear ends of a vehicle, as desired, or simultaneously for raising both ends of said vehicle, said jack assembly being rugged, durable and relatively simple, as well as quickly and accurately positionable beneath a vehicle, and safety means preferably are included to releasably latch either jack unit in elevated position.

Details of the foregoing objects and of the invention, as well as other objects thereof, are set forth in the following specification and illustrated in the drawings comprising part of the same.

In the drawings:

Fig. 3 is a perspective view of the jack assembly shown in Figs. 1 and 2 but illustrating the front and rear jack units in elevated positions.

Fig. 4 is a fragmentary perspective elevation of a portion of the front jack unit in elevated positions, this view being on a larger scale than that used in Fig. 3.

Fig. 5 is a fragmentary perspective view of a portion of the rear jack unit and illustrating, in solid and broken lines, respectively, retracted and extended positions of auxiliary supporting member of said rear jack unit.

Figs. 6, 7 and 8 respectively are side elevations showing the jack assembly in operative positions relative to a vehicle, the first of these figures showing both the front and rear ends of the vehicle elevated, Fig. 7 showing only the rear end elevated, and Fig. 8 showing only the front end elevated.

Figure 9:
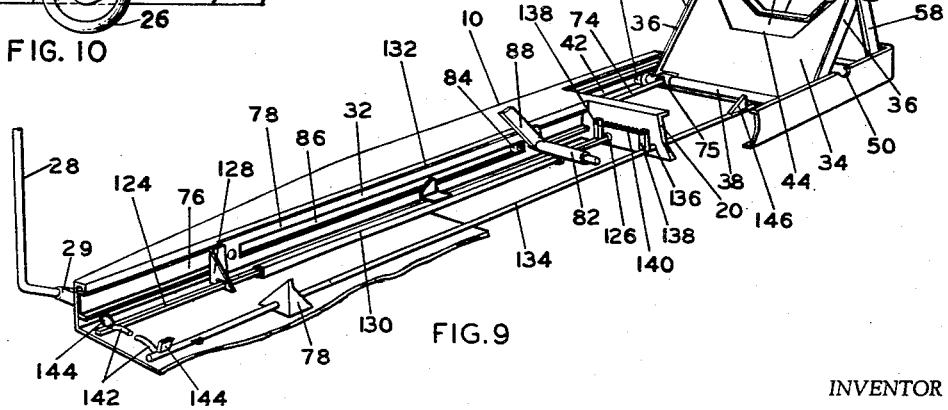

Fig. 9 is a perspective view similar to Fig. 3, partly broken away, to illustrate details of latching mechanism.

Figure 10:
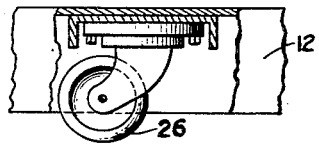

Fig. 10 is a fragmentary side elevation, partly broken away, showing the front casters which support the frame of the jack assembly.

This application is a continuation-in-part of pending application Serial No. 345,588, filed March 30, 1953, now abandoned. The jack assembly comprising the subject matter of the present invention embodies all of the basic principles of the jack assembly described and claimed in said pending application. Since the filing of said application however it has been found that a number of refinements and changes advantageously could be made in various of the units and elements of the jack assembly which result in decreasing the cost of manufacturing, improving the operation thereof as well as the appearance, minimizing the weight of the assembly and simplifying the construction thereof. Thus, to simplify the illustration and description of the invention, an exemplary jack assembly has been illustrated in the drawings and is described hereinafter which includes most of the inventive concepts of the exemplary jack illustrated and described in said aforementioned application but also including the refinements which constitute changes in and additions to the jack assembly described and illustrated in said application.

Figure 1:
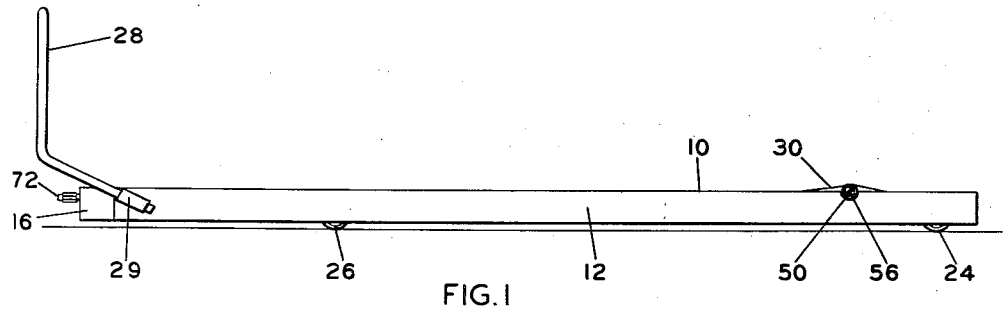
Fig. 1 is a side elevation of a jack assembly embodying the principles of the present invention and illustrating the jack units disposed in inoperative positions.
Figure 2:
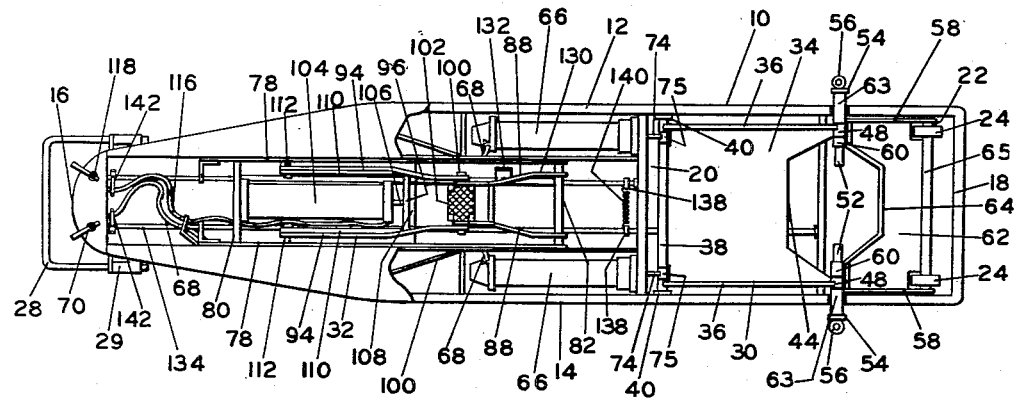
Fig. 2 is a top plan view of the jack assembly illustrated in Fig. 1, part of the structure being broken away so as better to illustrate details of the mechanism.

Referring to the drawings, and particularly Figs. 1 and 2, the jack assembly 10 embodying the present invention comprises side frame members 12 and 14 which are spaced apart in parallel manner in their rearward portions but are bent inwardly at their forward portions so as to produce a somewhat pointed front end on the assembly, the forward extremity 16 of the frame being curved as fully shown in Fig. 2. The rear ends of the side frame members 12 and 14 are connected by a rear frame member 18. All of the frame members conveniently may be formed by channel sections and connected preferably by welding. Extending between the side channel members 12 and 14 is a cross-member 20 which, similarly to the frame members, preferably is a channel member. This may be secured by welding, riveting or otherwise at its ends to said side frame members.

Extending between the side frame members 12 and 14 adjacent the rear ends thereof is an axle-like bar or rod 22. Preferably, the rod 22 is fixed at its ends to said side frame members and a pair of wheels 24 are rotatably supported on the rod or axle 22. A pair of caster wheels 26 also are supported by the frame members 12 and 14, or any other suitable portion of the frame, it being understood that the caster wheels 26 are disposed adjacent opposite sides of the frame members and, preferably, the caster wheels 26 are pivoted for movement about vertical axes so as to facilitate the positioning of the jack assembly beneath a vehicle at any desired position.

Movement and manipulation of the vehicle assembly 10 is achieved preferably by a suitable handle 28 which, for example, may be formed from pipe or similar material and fitted into sockets 29 which extend forwardly and upwardly and are fixed to the side frame members 12 and 14. Thus, when a vehicle is driven over the jack 10, for example from the rear of the jack, and it is desired to drive the vehicle from the forward end of the jack, the handle 28 is so shaped that it may be removed easily from the jack sockets 29 to permit such driving of the vehicle. It will be understood from the foregoing that the width of the entire jack assembly 10 is narrower than the distance between the wheels of any vehicle to be elevated thereby. Likewise, any lateral projections on said assembly, particularly when retracted, are so dimensioned as not to engage the wheels of a vehicle when the vehicle and jack are being positioned relative to each other for elevation of the vehicle. Hence, normally no part of the jack assembly, other than the front end thereof, extends beyond the outer boundaries of a vehicle when relatively positioned as aforesaid.

Preferably, the caster wheels 24 and 26 project a minimum distance below the bottom of the frame members of the assembly 10 so that the jack assembly may be positioned readily beneath modern vehicles which are so constructed that relatively little distance is provided between the under surfaces and the roadway.

The assembly 10 comprises several jack units best illustrated in Figs. 2 and 3. The rear jack unit is indicated generally as 30, while the front unit is indicated 32. The jack units 30 and 32 are movable relative to each other and at least one of these units is movable longitudinally relative to the frame members 12 and 14. In the preferred embodiment of the invention, the front jack unit 32 is the one which is movable relative to the frame members and details of the mechanism effecting such movement are described hereinafter.

The rear jack unit 30 constitutes a forward plate member 34 provided with reinforcing side flanges or links 36. The lower end, or left-hand end as viewed in Fig. 2, of the plate member 34 is connected to a transverse sleeve through which an axle rotatably extends and rollers 40 are rotatably mounted on opposite ends of said axle and are positioned for rolling guided movement within guide channels 42 disposed in and supported by each of the side frame members 12 and 14.

The opposite or upper edge of plate 34 has a notch 44 extending thereinto, said notch, when the rear jack unit 30 is elevated, accommodating part of the running or driving mechanism of a vehicle such as the differential, drive shaft, or torque tube, as the case may be, when said vehicle is elevated by the jack assembly. Said upper end of the plate member 34, adjacent opposite ends of the notch 44, comprise projections to which are fixed axially aligned guide sleeve sections 48 which, for example, are welded to the plate 34 and the flanges or links 36. The sleeves 48 extend in opposite directions transversely to longitudinal axis of the jack assembly 10. The side frame members 12 and 14 are provided with suitable notches 50 which are for purposes to be described.

A pair of preferably cylindrical auxiliary frame engageable and supporting members 52 are disposed so as to be longitudinally slidable within the guide sleeve sections 48. The outer extremity of each of these auxiliary supporting members 52 is provided with a flange 54 and a manipulating ring 56. While the jack assembly is being positioned beneath a vehicle, the auxiliary supporting members 52 usually are disposed in their retracted positions shown in Fig. 3 and also, in full lines, in Fig. 5. However, after the jack assembly 10 is disposed in desired position beneath a vehicle, the auxiliary supporting members 52 may be engaged by any suitable rod or bar, or even manually, at the ring 56 for example, and the members 52 are moved longitudinally outward so as to dispose the outer flanged end of the supporting members 52 beneath the rearward portions of the side frame members 57 of a vehicle. The flanges 54 also will aid in properly positioning the auxiliary supporting members 52 relative to said side frame members of the vehicle. Further, the fit between the auxiliary supporting members 52 and the supporting and guide sleeve sections 48 therefor preferably is relatively close.

The rear jack unit 30 also includes a pair of links 58 which are apertured at one end to receive the axle 22 for pivotal support thereby and the opposite ends thereof have sleeve sections 60 welded or otherwise fixed thereto. The sleeves also slidably receive the auxiliary supporting members 52, these supporting members also constituting hinge pintles which connect the sleeve sections 48 and 60 for relatively pivotal movement about common axes.

Extending between and connected to the links 58 is a bracing plate 62 which is notched to receive the casters 24 and also the upper edge thereof, when considered in elevated position, has a notch 64 therein which, like 44, receives part of the driving mechanism of a vehicle such as the differential, torque tube or the like when the same is elevated by the jack unit. A sleeve 65, attached to the outer edge of plate 62 by welding or otherwise receives axle 22 which pivotally supports plate 62 and link 58 relative to the frame member 12 and 14. The upper portions of plate 62 comprise projections to which sleeve sections 63 are secured by welding or otherwise, whereby the sleeve sections 60 and 63 are fixed to plate 62 and are axially aligned with and receive therebetween sleeve sections 48 which are fixed relative to plate 34.

Thus, the inner ends of auxiliary supporting members 52 are slidable into the spaces between the projections on the upper portions of plates 34 and 62, supported within the axially aligned sleeve sections 48, 60 and 63 which cooperate to form composite guiding and supporting means for members 52, the assembly constituting hingedly connected, toggle-like plate members movable from substantially flat positions into elevated, A-shaped formation. The supporting members 52 are disposed at the apex of the rear jack unit 30.

A pair of operating, fluid pressure cylinders 66 are fixed at one end of the cross-member 20 as clearly shown in Fig. 2. While it is within the purview of the invention that the cylinders 66 may be arranged to operate by use of hydraulic fluid, it is preferred to utilize air under pressure in view of the ready availability of the same in service stations, garages, and the like. Hence in the present illustration, it will be understood that the cylinders 66 are designed to operate by air pressure. Thus, the forward ends of said cylinders have air pressure conduits 68 connected thereto, said conduits extending to an operating valve 70 which controls the rear jack unit 30, there also being a conduit, not shown, between the valve 70 and inlet port 72 which is connectable to a source of compressed air if this type of fluid is used as the operating medium for the jack unit.

Projecting rearwardly from each of the cylinders 66 is a piston rod 74, the outer ends of said rod being connected to sleeves 75 which surround the axle for rollers 40. Said cylinders act in unison so as to actuate the piston rods 74 in unison adjacent opposite ends of the sleeve 38. When air, for example, under pressure is introduced into the outer ends of cylinders 66, the sleeve 38 and lower edge of plate 34 are moved rearwardly so as to elevate the sleeves 48, 60 and 63, as well as the auxiliary supporting members 52 into engagement with the rearward portions of the side frame members 57 of a vehicle so as to elevate the same independently of the rear wheels and axle thereof. Such elevation occurs by moving the plate 34 relative to the links 58 and bracing plate 62, these plates assuming an A-shape as clearly shown in Figs. 3 and 5 particularly. The plates 34 and 62 readily brace the guide sleeves and auxiliary supporting members 52 against lateral downward movement relative to the jack assembly 10, thereby preventing downward movement of the vehicle supported thereby.

When it is desired to lower the rearward end of the vehicle, it is only necessary to manipulate the control valve 70 which preferably is of such nature as to permit the compressed air acting against the pistons within the cylinder 66 to be discharged to atmosphere and the weight of the vehicle, as well as the jack elements per se, will operate to lower the rear jack unit to the position of the components thereof illustrated in Fig. 1. Such lowering movement will take place smoothly and without any undue jar to the vehicle, especially if the control valve 70 is manipulated suitably. The members 52 are received within the notches 50 when in such lowered position.

Extending longitudinally of the jack assembly 10 between the cross-member 20 and the forward end of the frame structure is a pair of parallel guide channels 76 which preferably are formed from conventional channel irons, thereby minimizing expense. The ends of these channels may be secured to the forward ends of the side frame members 12 and 14, as well as the cross-member 20, by riveting, welding, or otherwise. The operating cylinders 66 preferably are disposed compactly between the side frame members 12 and 14 and said longitudinal guide channels 76. The longitudinal guide channels 76 support the front jack unit 32 for independent longitudinally slidable movement relative to the rear jack unit 30.

The front jack unit 32 essentially comprises side frame members 78, which, at their ends, are connected by end bars 80 and 82. The end bars 80 and 82 preferably are in the nature of axles and extend beyond the side members 78 so as to rotatably support rollers or casters 84 thereon for rolling movement within the guide channels 76. Thus, the rollers 84 permit free slidable or rotatable movement, preferably of an anti-friction nature, of the front jack unit 32 relative to the guide channels 76 as well as the main frame of the jack assembly 10. By such arrangement, after the jack assembly 10 has been positioned relative to a vehicle so as to dispose the rear jack unit 30 in suitable position beneath such vehicle, the front jack unit 32 then manually may readily be adjusted or positioned so as to be disposed suitably relative to the front frame member, for example, of a vehicle.

The side members 78 conveniently may be formed from suitable plate material such as steel sheet stock and the same have longitudinal slots 86 therein for purposes to be described. The jack or elevating members of the front jack unit 32 comprise articulated links 88 which are spaced apart in a transverse direction as best illustrated in Figs. 3 and 4. Said links, at their lower ends, are spaced apart a greater distance than at the top and either are fixed or pivotally connected to end bar or axle 82. Preferably, for purposes of strength, the links 88 include a cross-brace 90 which is welded at its ends to links 88.

A pair of forward links 94, similar to links 88, are connected to a cross-brace 96 and also are pivotally connected at the upper ends thereof to pintles 100 which preferably extend from opposite sides of a counter-weighted shoe 102, the latter being engageable with the front frame member of a vehicle so as to contact a minimum lengthwise portion of said frame, thus permitting maximum free suspension of the front wheels of the vehicle when the front end thereof is elevated.

Suitably fixed at its forward end to the end bar 80 of the front jack unit 32 is a fluid pressure actuated cylinder 104. A piston rod 106 projects rearwardly from said cylinder and is connected to a cross-head 108 which, if desired, may constitute a bar.

The opposite ends of the cross-head 108 are connected to connecting links 110 which extend and are pivotally connected to pintles 112, the latter projecting guidably through the slots 86 for rotatably supporting guide rollers 114 on the outer ends thereof. This construction is best illustrated in Fig. 4. Thus it will be seen that the guide rollers 114 support and guide the lower ends of the forward links 94 of the front jack unit 32 as well as the forward ends of the connecting links 110.

The auxiliary frame comprising side members 78 which contain slots 86 constitute effective means for guiding the pintles 112 on which the guide rollers 114 are rotatably supported. From Figs. 3 and 4, it will be seen that the pintles 112 extend through the slots 86 in said side members, whereby the rollers 114 move in the same longitudinal guide channel 76 which rotatably supports the rollers or casters 84 of said auxiliary frame. Thus, no additional guide means are required for guide rollers 114 which control the position of the lower ends of the forward links 94 of the front jack unit 32. The guide rollers 114 also stabilize the operation of the piston rod 106 which is connected to the cross-head 108 and connecting links 110.

The forward end of the cylinder 104 is connected by a flexible conduit 116 to control valve 118 for the front jack unit 32. The control valve 118 is disposed in a conduit, not shown, between the inlet port 72 and the flexible conduit 116. Also, the valve 118 is similar to the valve 70 in that, when it is desired to lower the jack unit, the handle of the valve is moved to a position whereby the air under pressure within the cylinder 104 is discharged to the atmosphere.

From the foregoing, it will be seen that the valves 70 and 118 control the operation of the front and rear jack units after the latter have been positioned suitably relative to the rearward portions of the side frame members and the front frame member of a vehicle. Either valve may be operated independently of the other so as selectively to actuate either of the jack units. If desired to elevate both ends of a car or vehicle simultaneously, then the valves 70 and 118 are operated simultaneously. However, the jack assembly is such that it is universal and permits the elevation of either the front or rear end of a vehicle, as well as both ends simultaneously or in succession.

Further, if it is desired to move the jack assembly 10 from one bay of a garage or service station to another, usually it is only necessary to disconnect the inlet port 72 of the jack unit from the air pressure hose. Then, when the jack is positioned as desired in another location within the garage, the inlet port 72 may be connected to the same or another air pressure hose.

Inasmuch as the jack assembly 10 is provided with casters 24 and 26 adjacent opposite ends thereof, the jack assembly may be moved readily either without a vehicle thereon or, to a limited extent, the jack also may be moved while supporting either one or both ends of a vehicle. Such movement of course will be restricted somewhat by the air hose or other fluid conductor to which the jack assembly is connected.

The various positions to which the jack units of the jack assembly may be elevated for purposes of raising either both ends or either end of a vehicle are illustrated in Figs. 6 through 8. In Fig. 8, for example, both ends of the vehicle 120 are elevated and this figure well illustrates the portions of the vehicle which are engaged respectively by the auxiliary supporting members 52 of the rear jack unit 30, and the counterbalanced shoe 102 of the front jack unit 32, said shoe engaging the front frame member 122 of the frame of the vehicle 120. A fragmentary portion of the rear portion of the side frame members 57 are shown in Figs. 6 and 7.

The jack assembly 10 also preferably includes safety latching mechanism for both jack units 30 and 32. Exemplary safety mechanism constructed in accordance with the principles of the present invention are illustrated best in Figs. 2 and 9. The specific forms of exemplary safety mechanism illustrated in these figures comprise an elongated shaft 124 which preferably is of a suitable geometric shape in cross-section such as square. The shaft 124 is mounted in a bearing in the forward portion of the frame and also bearing 126 in cross-member 20. Further, guide member 128, comprising a bracket fixed to one of the side members 78 of the auxiliary frame which supports the front jack unit 32, facilitates the proper positioning of the shaft 124 relative to said auxiliary frame as the latter is positioned variably longitudinally of the main frame of the assembly 10.

Surrounding shaft 124 and telescopically movable therewith is a complementary sleeve 130 which, though movable longitudinally relative to shaft 124, is rotatable therewith due to the complementary cross-sectional shape thereof which, in the specific illustration, is square. The sleeve 130 is rotatably supported by the cross-members 80 and 82 of said auxiliary frame, whereby the sleeve 130 is movable longitudinally of the assembly 10 with the said auxiliary frame. Fixed to the sleeve 130 and movable therewith is a latch 132 preferably provided with a camming surface extending longitudinally thereof and terminating in a latching shoulder which extends vertically upward for engagement with a suitable member of the front jack unit 32, such as cross-head 108, when said cross-head has moved sufficiently to cause the vehicle frame engaging shoe 102 to be elevated to its preferred highest position.

It will be seen from Fig. 9 particularly that the latch 132 extends laterally from the sleeve 130, whereby as the cross-head engages the sloping face of the latch 132, it will tend to cam the latch counter-clockwise as viewed in Fig. 9 until the cross-head has traversed the entire length of the camming surface and drops behind the rearward vertical or highest shoulder of the latch. When the cross-head and latch are thus arranged in latching position, even though the air pressure within the cylinder 104 should fail or decrease, the links 88 and 94 of the front jack unit can not move to their depressed or inoperative position and will support the shoe 102 and the vehicle frame portion resting thereon in elevated position.

The safety mechanism of the present invention also includes elongated shaft 134 which may be cylindrical if desired, the same being pivotally supported adjacent its ends in a manner similar to shaft 124 and substantially is parallel thereto. Another bearing 136 is provided in cross-member 20 to support a portion of said shaft 134. The shafts 124 and 134 also have vertically extending ears 138 projecting therefrom adjacent cross-member 20, said ears respectively being fixed to said shafts and a tension spring 140 is connected to the upper ends of said ears.

Also fixed to and projecting laterally from the shafts 124 and 134 are operating handles 142 which preferably are positioned adjacent the forward end of the jack assembly so as to be convenient to an operator while manipulating control valves 70 and 118. If desired, stops 144 also may be fixed to the shafts 124 and 134 to prevent excessive movement thereof. It will be seen that spring 140 serves normally to maintain the latch 132 in its operative or upright position but, when it is desired to permit the links 88 and 94, as well as shoe 102 of the front jack unit 32 to move to its lowered or inoperative position, the handle 142 connected to shaft 124 is moved counter-clockwise as viewed in Fig. 9, against the action of spring 140, so as to remove the cam 132 from its latching or operative position relative to the cross-head 108. When such movement of the front jack unit is desired, control valve 118 also is manipulated to permit the fluid under pressure within cylinder 104 to escape and the weight of the vehicle as well as the jack unit member per se will be sufficient to cause said jack unit to move to its inoperative position.

Fixed to the portion of shaft 132 which projects rearwardly from cross-member 20 is a latch 146 which preferably is engageable with the sleeve 38 comprising part of rear jack unit 30. Either said portion of the shaft 134 which extends rearwardly from cross-member 20 may be bent laterally or said portion of said shaft may be sufficiently flexible that the cam 146 may be depressed while the sleeve 38 is moving rearwardly in jack elevating direction so that, when the sleeve 38 has cleared latch 146, the latch will automatically be restored to its latching position illustrated in Fig. 9, wherein it will prevent forward or depressing movement of sleeve 38 of said rear jack unit.

When it is desired to permit the rear jack unit to move to its inoperative or depressed position, it is only necessary to manipulate handle 140 in clockwise direction as viewed in Fig. 9 so as to move the latch 146 from a position in which it obstructs such movement of sleeve 38. Valve 70 also is operated to permit the fluid under pressure in cylinders 66 to be released. After sleeve 38 has moved forwardly past latch 146 while the rear jack unit is being depressed, handle 142 may be released and spring 140 will restore latch 146 to its normal or operative position.

From the foregoing, it will be seen that the present invention provides a portable jack assembly comprising relatively adjustable front and rear jack units which are engageable with the frame portions of a vehicle so as to permit free gravity suspension of the axles and wheels of said vehicle. Such suspension of the axles and wheels is permitted as a result of the forward jack unit having only a single member such as shoe 102 which engages the preferably central portion of the front frame member 122 of the vehicle frame, the other jack unit having laterally extendable or adjustable auxiliary supporting members 52 which engage preferably the rearward portions of the side frame members of the vehicle frame. Thus, the frame of the vehicle is provided with a three-point suspension which affords stability to the vehicle while supported, yet permits all of the axles and wheels of the vehicle to be freely suspended in such a manner that they may assume their lowermost natural position. When in such position, the wheels will substantially be clear of the skirted fenders so as to permit the wheels to be accessible for any desired work which is required either upon the wheels, the fenders, or any other normally inaccessible portions of the vehicle which are rendered readily accessible when the wheels and axles are moved to their lowered position.

The several jack units of the entire jack assembly readily are operable by any suitable fluid under pressure such as air which is readily accessible in garages, service stations and the like. Further, when the jack units are in elevated positions, latches operate to prevent accidental lowering of said units.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A vehicle jack assembly comprising in combination, an elongated frame including side members and arranged to be positioned longitudinally beneath a vehicle and narrower than the vehicle so as to be positionable between the wheels thereof, means portably supporting said jack assembly, a rear jack unit supported by said frame and including a pair of vehicle frame engageable members extending transversely to the axis of said jack frame and spaced apart laterally of said frame sufficiently to engage respectively when elevated the rearward portions of the side frame members of a vehicle, an auxiliary frame narrower than said elongated frame and supported thereby for longitudinal movement therein, a front jack unit supported by said auxiliary frame and including a vehicle frame engageable member positioned substantially intermediately between the sides of said auxiliary frame and positionable when elevated to engage an intermediate portion of the front frame member of a vehicle, means positioned between said auxiliary frame and said side members of said elongated frame and operable to elevate said frame engageable members of said rear jack unit into engagement with said side frame members of a vehicle, additional means operable to elevate the frame engageable member of said front jack unit into engagement with said front frame member as aforesaid, whereby said frame engageable members of said jack units engage said vehicle frame at triangularly arranged positions, thereby to elevate said vehicle by engaging said frame only so as to permit the axles and wheels of said vehicle to suspend freely downward from said vehicle frame.

2. The jack assembly set forth in claim 1 further including longitudinally extending and parallel guide channels positioned inwardly from the side members of said elongated frame and extending from one end of said elongated frame toward the other end thereof, and supporting and guide rollers on said auxiliary frame adjacent opposite ends thereof and projecting from opposite sides thereof, said rollers being disposed in said guide channels to support said auxiliary frame and jack unit thereof for adjustable movement lengthwise of said longitudinal frame and relative to said rear jack unit.

3. The vehicle jack assembly set forth in claim 2 further including a cross-member extending between and fixed to the side members of said elongated frame intermediately of the ends thereof and one end of each of said guide channels being connected thereto for support thereby.

4. The vehicle jack assembly set forth in claim 1 further including a cross-member extending between and fixed to the side members of said elongated frame intermediately of the ends thereof, and the elevating means for said rear jack unit comprising fluid operated cylinder and piston units, said units being supported by said cross-member and interconnected to said rear jack unit.

5. The vehicle jack assembly set forth in claim 1 further characterized by said additional means to elevate said front jack unit comprising a fluid operated cylinder and piston unit mounted longitudinally between the sides of said auxiliary frame and movable therewith relative to said elongated frame.

6. The vehicle jack assembly set forth in claim 1 further characterized by said jack units comprising toggle-like members and means pivotally connecting one end of each member for elevation of said ends into a A-shaped arrangement, the apex portions of said units supporting vehicle frame engaging and supporting members and the elevating means for said jack units being interconnected to the other end of one of said toggle-like members of each jack unit to move said other end longitudinally relative to said elongated frame and thereby raise and lower said vehicle frame engaging and supporting members, in combination with manually operated safety latch means movably supported by said elongated frame for movement between operative and inoperative positions and operable when in operative position to be engaged by said other end of said one toggle-like member of each unit when said units are in vehicle supporting position and prevent movement of said units from said position until said latch means have been moved to inoperative position.

7. The vehicle jack assembly set forth in claim 6 further characterized by said safety latch means comprising rod means extending longitudinally of said elongated frame and projections extending transversely therefrom engageable with said other end of said one toggle-like member of each unit, said rod means being supported for axial rotation between operative and inoperative positions of said projections thereon.

8. A vehicle jack assembly comprising in combination, a portable elongated frame including spaced side members arranged to be positioned longitudinally beneath a vehicle and narrower than the vehicle so as to be positionable between the wheels thereof, a first jack unit supported by said frame and including a pair of vehicle frame engageable members extending transversely to the axis of said jack frame and spaced apart laterally thereof sufficiently to engage respectively when elevated the side frame members of a vehicle, a cross-member extending between and fixed to said side members of said frame intermediately of the ends thereof, a pair of spaced elongated parallel guide channels extending longitudinally of said frame between one end thereof and said cross-member and fixed thereto to be supported thereby, said guide channels being between the side members of said frame, a second jack unit supported by said guide channels for adjustment longitudinally thereof and including a vehicle frame engageable member positioned substantially intermediately between the sides of said front jack unit and positionable when elevated to engage an intermediate portion of a cross-frame member of a vehicle, fluid pressure actuated operating means comprising a pair of cylinders respectively fixed between said guide channels and side members of said frame and piston rods connected to said first jack unit to operate the same, and additional fluid pressure actuated means carried by said second jack unit and comprising a cylinder and piston connected to said second jack unit to operate the same and adjustable therewith relative to said frame, said fluid pressure actuated means being operable independently to move the frame engageable members of said jack units into engagement with the frame of a vehicle at triangularly arranged positions, thereby to elevate said vehicle by engaging the frame thereof only and permit the axles and wheels of said vehicle to suspend freely downward from said vehicle frame.

9. A vehicle jack assembly comprising in combination, an elongated frame arranged to be positioned longitudinally beneath a vehicle and narrower than the vehicle so as to be positionable between the wheels thereof, a jack unit supported by said frame and extending transversely to said frame and comprising a pair of members hingedly connected at one end of each, said members having notches extending inward from the hingedly connected ends thereof to provide projections and said hinge means comprising tubular means axially aligned and fixed respectively to said projections of said members, a pair of elongated vehicle frame engageable pintle members longitudinally slidable within and supported respectively by said aligned tubular means and adjustable longitudinally of said jack unit in opposite directions transversely of said elongated frame, the inner ends of said pintle members being movable into the space between said projections on said notched members and the outer ends of said pintle members being projectable from said projections beyond the transverse ends of said jack unit sufficiently to engage respectively when the jack unit is elevated the side frame members of a vehicle, whereby said pintle members hingedly connect said members of said jack unit in any longitudinal position of said pintles, and means operable to elevate said frame engageable pintle members of said jack unit by relative pivotal movement of said members of said jack unit into A-shaped arrangement to effect engagement of the outer ends of said pintles with the frame of a vehicle, thereby to elevate said vehicle by engaging said frame only so as to permit the axle and wheels of said vehicle to suspend freely downward from said vehicle frame.

10. The jack assembly set forth in claim 9 further characterized by said pintle members being cylindrical rods having means on the outer ends thereof engageable manually to effect axial movement thereof relative to said tubular means receiving the same.

11. The jack assembly set forth in claim 1 further characterized by said rear jack unit comprising pairs of links, each pair being pivotally connected together at one end and said pairs respectively being positioned adjacent each side member of said elongated frame, a bracing plate extending transversely of said frame between one link of each pair and connected thereto to brace the same against transverse movement, and a pair of vehicle frame engageable members spaced apart and carried respectively by said pairs of links adjacent the pivotally connected ends thereof.

12. The jack assembly set forth in claim 11 further characterized by said plate having a notch extending inward from the edge thereof nearest the pivoted axis of said links to provide clearance for the driving mechanism of the vehicle.

13. The jack assembly set forth in claim 11 further including a tubular member fixed to the lower edge of said plate considered relative to the elevated positions of said plate, an axle extending through said tubular member, and supporting rollers carried by said axle adjacent opposite ends thereof.

References Cited in the file of this patent
UNITED STATES PATENTS

| | | |
|---|---|---|
| 1,564,713 | Reiter | Dec. 8, 1925 |
| 1,874,420 | Barrowman et al. | Aug. 30, 1932 |
| 2,085,720 | Nilson | June 29, 1937 |
| 2,124,726 | Blum | July 26, 1938 |
| 2,147,837 | Gottman | Feb. 21, 1939 |
| 2,182,705 | Rissane | Dec. 5, 1939 |
| 2,486,918 | Bowen | Nov. 1, 1949 |
| 2,533,980 | Weaver | Dec. 12, 1950 |
| 2,576,907 | Wallace | Nov. 27, 1951 |
| 2,612,344 | Thompson | Sept. 30, 1952 |
| 2,613,914 | Wallace | Oct. 14, 1952 |
| 2,704,584 | Tzschoppe | Mar. 22, 1955 |